(12) United States Patent
Chien

(10) Patent No.: US 9,274,342 B2
(45) Date of Patent: Mar. 1, 2016

(54) LED LIGHT HAS KALEIDOSCOPE MEANS

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 36 days.

(21) Appl. No.: 14/024,229

(22) Filed: Sep. 11, 2013

(65) Prior Publication Data

US 2015/0070656 A1 Mar. 12, 2015

(51) Int. Cl.
*F21V 21/00* (2006.01)
*G02B 27/08* (2006.01)
*G02B 19/00* (2006.01)

(52) U.S. Cl.
CPC .............. *G02B 27/08* (2013.01); *F21V 21/00* (2013.01); *G02B 19/0019* (2013.01); *G02B 19/0066* (2013.01)

(58) Field of Classification Search
USPC ........ 353/1, 2; 359/616, 617; 362/208.1, 202, 362/204, 205, 550, 559.05, 559.14
See application file for complete search history.

(56) References Cited

U.S. PATENT DOCUMENTS

| | | | | |
|---|---|---|---|---|
| 4,733,960 A * | 3/1988 | Bennett | | 353/1 |
| 4,776,653 A * | 10/1988 | Kaplan | | 359/616 |
| 5,191,368 A * | 3/1993 | Kalua et al. | | 353/2 |
| 7,900,384 B2 * | 3/2011 | Schnuckle | | 40/324 |
| 8,157,380 B2 * | 4/2012 | Peffer et al. | | 353/1 |
| 8,231,246 B2 * | 7/2012 | Chien | | 362/249.02 |
| 8,469,526 B1 * | 6/2013 | Chung | | 359/617 |
| 2003/0169501 A1 * | 9/2003 | Nelson | | 359/616 |
| 2009/0284960 A1 * | 11/2009 | Chien | | 362/157 |
| 2012/0200828 A1 * | 8/2012 | Chien | | 353/1 |

* cited by examiner

*Primary Examiner* — William C Dowling
(74) *Attorney, Agent, or Firm* — Bacon & Thomas, PLLC

(57) ABSTRACT

An LED light with kaleidoscope effects includes an LED light source in the form of a matrix that can be electronically controlled to provide different images. Since image changing is carried out by turning on and off LEDs in the LED matrix, there is also no need for the changing or adjustment means to move the display unit(s) or inner medium (if any). Instead, the changing means only needs to change the LEDs color, brightness, and/or turn-on and turn-off timing or sequence.

9 Claims, 4 Drawing Sheets

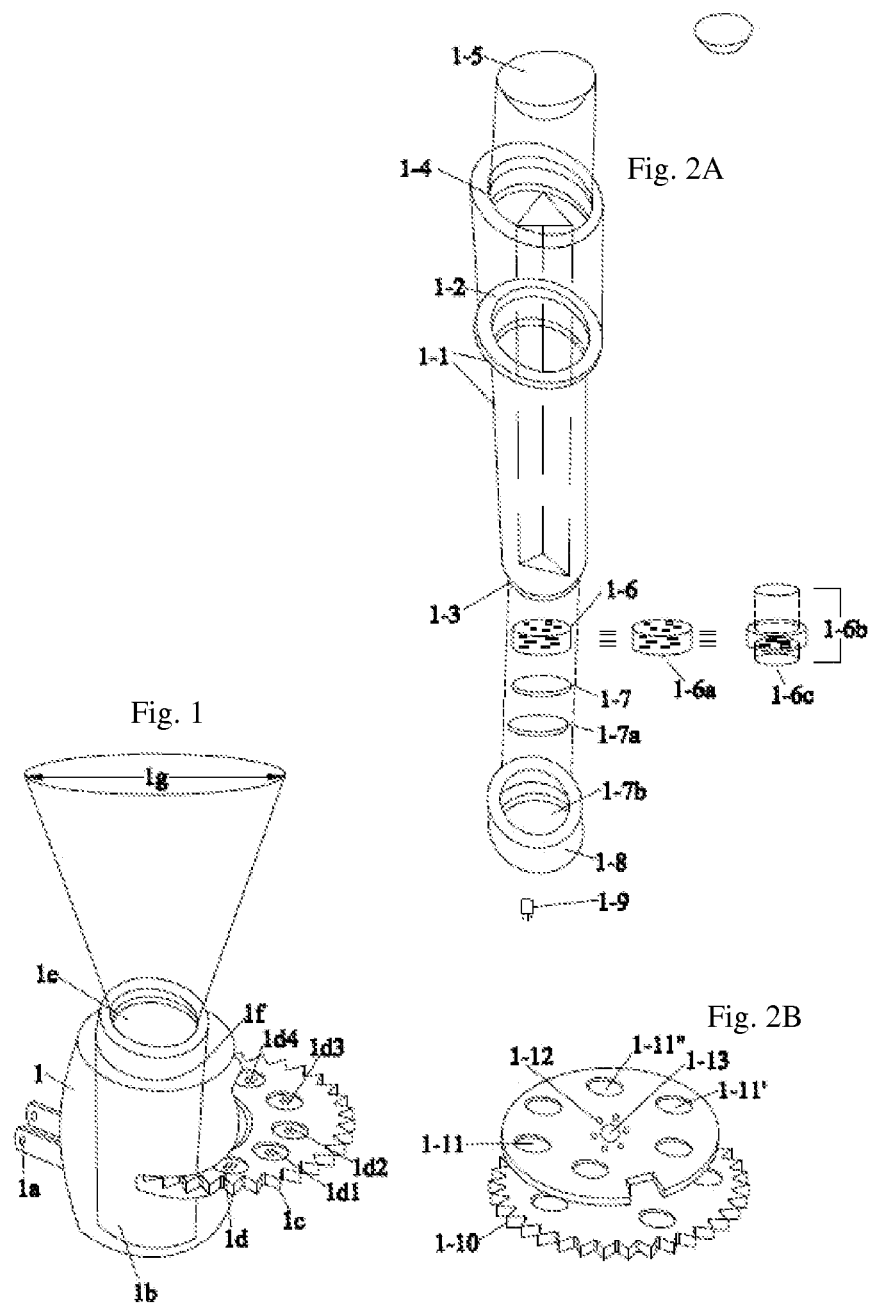

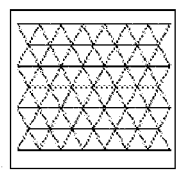
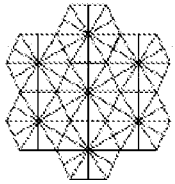
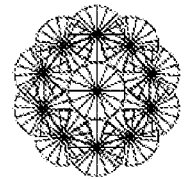

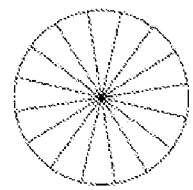
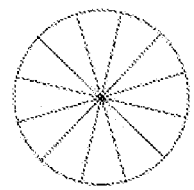
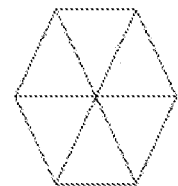

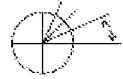

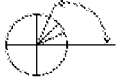
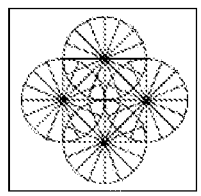
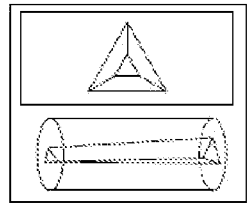
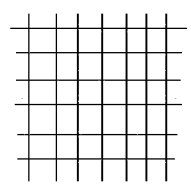
Fig. 9
Fig. 10
Fig. 11

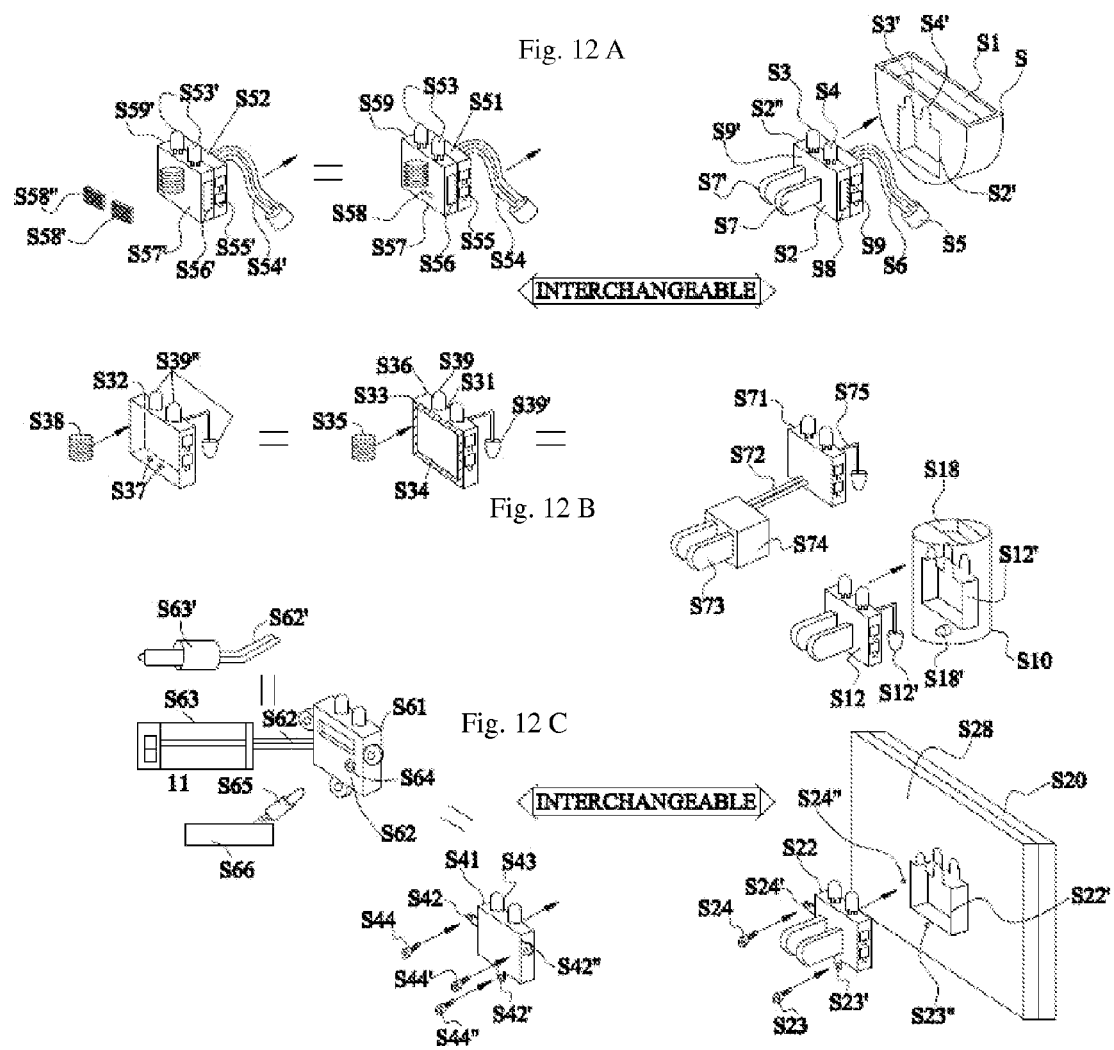

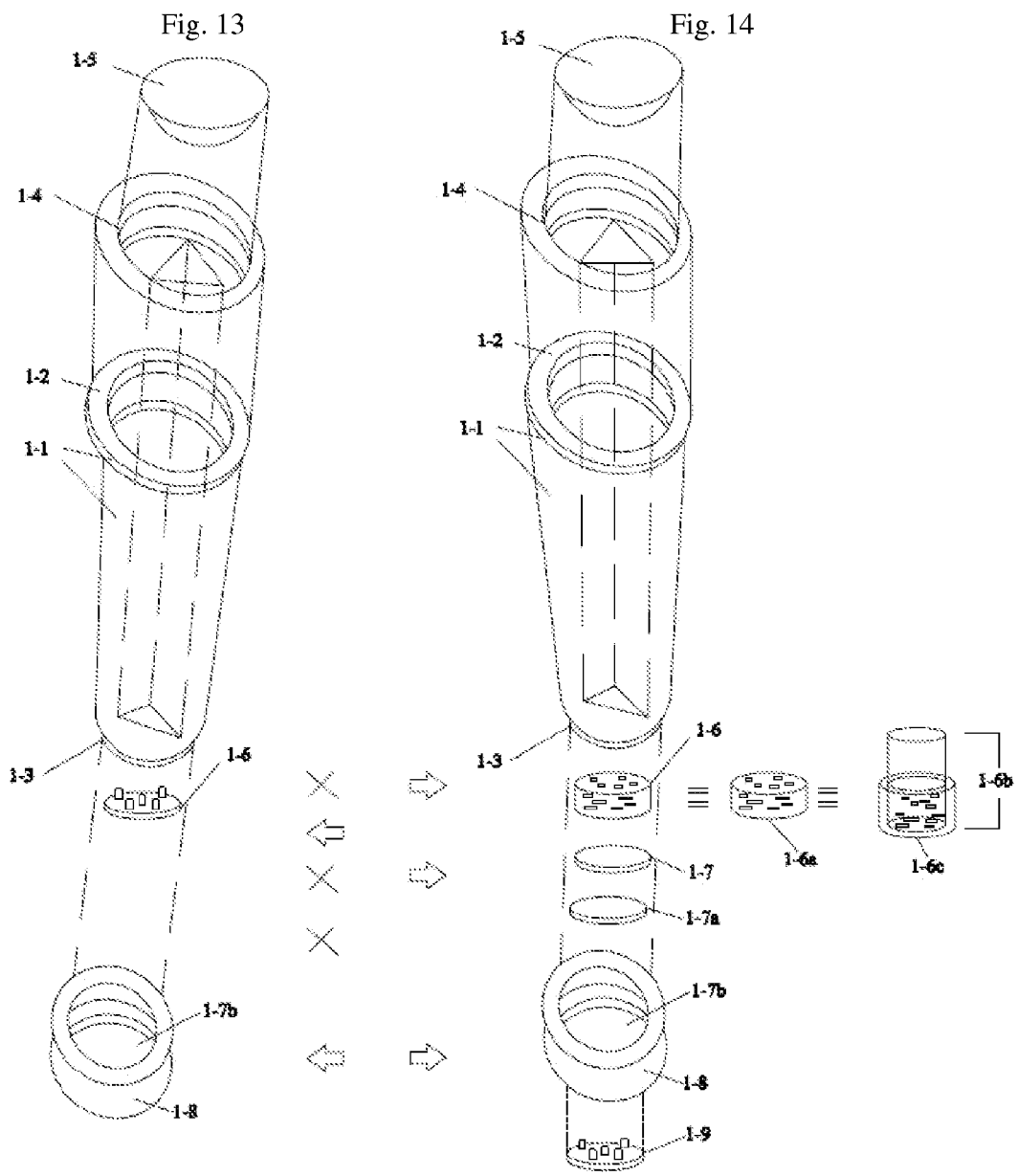

LED LIGHT HAS KALEIDOSCOPE MEANS

BACKGROUND OF THE INVENTION

This application has subject matter in common with the inventor's U.S. patent application Ser. No. 13/021,124, entitled "LED Light has Changeable Image and Pattern and filed on Feb. 4, 2011 (U.S. Patent Pub. No. 2012-0200828).

The application also has subject matter in common with the inventor's U.S. patent application Ser. No. 12/710,918, entitled "LED Light has More Than One Reflector Means", now U.S. Pat. No. 8,277,087, which discloses an LED light with a kaleidoscope means that has more than one reflective means, mirror, or mirror-like means assembled into the kaleidoscope means.

The application also has subject matter in common with the inventor's U.S. patent application Ser. No. 11/806,284, entitled "LED Light has More Than One Optic Means" and now U.S. Pat. No. 7,632,004, which discloses an LED light that is similar to that of the current invention in that it applies an optics means in front of or in back to create, adjust, magnify, reduce, or enlarge the an image, the LED light beams, the LED lights' image, or the shape of the image, and which includes any combination of optics lens, optics mirror, laser hologram, laser grating film, and optics assembly.

The inventor's U.S. Pat. No. 7,455,444 discloses an LED light having more than one LED light means that, like the LED light of the current invention, uses more than one LED to form matrix arrangements with one or more of the following additional elements: circuit means, IC means, sensor means, switch means, brightness control means, color mix means, color selection means, color freeze means, motor means, gear means, and turn-on and turn-off means that cause a certain number of LEDs to turn-on and off with a desired color, brightness, light brightness output, light functions, or matrix combinations. The additional elements may also include motor means, rotating means, gear set means, optics means, or laser means, to cause the kaleidoscope to create desired light patterns.

Additional applications of the inventor that have subject matter in common with the present application include U.S. patent application Ser. Nos. 12/948,953; 12/938,564; 12/886,832; 12/876,507; 12/771,003; 12/624,621; 12/914,584; 12/318,471; 12/318,470; 12/834,435; 12/292,153 (now U.S. Pat. No. 7,871,192); Ser. No. 12/232,505 (now U.S. Pat. No. 7,832,917); Ser. No. 12/318,473 (now U.S. Pat. No. 7,832,918); Ser. No. 12/624,621; (now U.S. Pat. No. 8,303,150); Ser. No. 12/771,003; (now U.S. Pat. No. 8,408,736); Ser. No. 12/876,507 (now U.S. Pat. No. 8,083,377); Ser. Nos. 12/886,832; 12/938,564; 12/948,953; and 13/021,107.

Included in the above-listed patent applications of the inventor are nine that disclose projection light devices.

The inventor's patent applications also disclose light devices that have interchangeable power AC and DC power source arrangements, including prong means, extension cords, adaptors, transformers, for connection to different power source types such as solar or wind power, batteries, chemical power, and biologic power that can be utilized for both desk top and plug-in types of projection light devices having built-in kaleidoscope means. These applications include U.S. patent application Ser. Nos. 12/318,473 and 12/940,255 (now U.S. Pat. No. 8,231,246).

As described above, the inventor's U.S. patent applications and issued patents thus disclose a wide variety of different LED light device features, including: (1) a project light device; (2) more than one optics means; (3) more than one LED; (4) more than one reflective means; (5) interchangeable power sources; (6) laser means; (7) an adjustable focus and position changing mechanisms (8) and a motor and gear set for moving the adjustable focus and positioning changing mechanisms, any or all of which may be used in the LED light device having kaleidoscope means disclosed in the inventor's U.S. patent application Ser. No. 13/021,124, which incorporates (1) the traditional kaleidoscope-means and a variety of constructions; (2) an LED light; (3) changing-means to cause an inner-medium of the kaleidoscope means to change position, orientation, or relationship; (4) control means to control the changing-means, light functions, brightness, color, and/or light effects; (5) a projection assembly with optics-means and parts and accessories; and (6) a power source to provide power to the LED device with kaleidoscope means during desired hours and thereby offer illumination.

SUMMARY OF THE INVENTION

The current invention provides improvements to the LED light with kaleidoscope means of the inventor's U.S. patent application Ser. No. 12/710,918, and also to the LED light with changeable image and pattern disclosed in U.S. patent application Ser. No. 13/021,124. A major improvement is to eliminate the need for a display means or "inner medium" as described above (though one can still be provided if desired), the LED light device instead (or in addition) using a plurality of colorful LEDs as to light source, the plurality of colorful LEDs acting as the display-unit so as to save the cost of the display-unit (or units). Since image changing is provided by turning on and off LEDs in an LED arrangement, there is also no need for the changing or adjustment means to move the display unit(s) or inner medium. Instead, the changing means only needs to change the LEDs color, brightness, and/or turn-on and turn-off timing or sequence. The LEDs preferably form a matrix that can have any arrangement of colors, brightness, and shape, with optional proper optics means to project colorful, splendid, eye-catching light effects, functions, and performance on desired areas including a ceiling, walls, or floor. An advantage of using a matrix of LEDs instead of an inner medium of display unit(s) is to offer a much brighter light beam to enable the image to be more easily seen (the number of LEDs can be any number, including up to hundreds of LEDs). Another advantage is to save design and construction time and cost for the eliminated inner medium/display units and changing/adjustment means since it is only necessary to provide a proper IC means, circuit means, control means, sensor means, and/or switch means to control the illumination of the LEDs in the matrix to emit colorful light in different patterns, such as in the following shapes: (#) (L) (M) (W) (O) (*) (V), shape or any other geometric shape permitted by the LED arrangement, the colorful light then being transmitted through the Kaleidoscope means with optional optics means to create changeable colorful splendid images at desired locations, resulting in simpler but more splendid, colorful, and eye-catching kaleidoscope light effects in comparison with the kaleidoscopic LED light devices described in the inventor's copending patent applications.

Kaleidoscopes for kids have been in use since 1816 in England and became a popular item during the 19th century in China and worldwide.

A kaleidoscope can have many different constructions and performance depending on market requirements. Kaleidoscope parts and accessories may include any of the following: a front surface mirror, a plastic mirror, a metal mirror, dichroic glass, a prism, a spectrum, mirrors, colored glass, a glass ball, dried flowers, paper, sand, oils with different density, miniature stuff, plastic pieces, colored pieces, transparent pieces, translucent pieces, colorful pieces, or any small objects that can fit into a space in the inner-medium.

According to the present invention, a preferred kaleidoscope construction may include any of: (a) a three mirror system, (b) a two mirror system, (c) a four mirror system, (d) a tapered mirror system, (e) a circular mirror system, and (e) any other construction with a desired mirror number and adjacent connecting angles to create changeable patterns.

The LED light means for projecting the kaleidoscope-means' image to a desired surface, (such as the LED matrix arrangement of the present invention), may be supplied with power from a plug-in outlet to get continuous power to turn on the inner super bright LED(s). However, it will also be appreciated that the power may be supplied from a conventional battery, adaptor, transformer, generator, chemical power, rechargeable battery, or any power source available from the marketplace for supplying power to an LED light, a light device for a desk top, a plug-in LED light, or any other LED light that can be installed on any surface installation for any purpose.

The LED light means disclosed in the inventor's prior applications and patents and used in the present invention can have any shape, specification, size, or style (one chip, multiple chips, or built-into an IC), and are preferably super bright or high powered LEDs arranged into one or more matrices to offer sufficient brightness to allow incorporation with projection means such as the ones described in the inventor's copending and prior patent applications. and replace the inner-medium/display-units described in the inventor's other patent applications, as cited and discussed above.

As in the inventor's earlier patent applications and patents directed to image projection, the current invention's projected image is bigger than the display-unit or LED matrix's original size, up to a thousand times, so as to enable projection of the changeable image to anywhere desired. The image may include any geometric shape, including the ones shown in FIGS. 3-11, and is not limited to the preferred kaleidoscope means construction illustrated herein. Variations may include multiple optics means, mirror means, or reflective means, and all such variations may still fall within the scope of the current invention.

The projection optics means used in connection with the present invention includes at least one optics means for projecting a kaleidoscope image onto a desired surface, and may include any one or more of the following elements: an optics lens, a convex or concave lens, a lens assembly, telescope means, a film, a display-unit, a transparent material, and a translucent material, laser created means, lenticular means, a grating film, a hologram means, Lcos means, digital data means, screen-means, and display-means, with the image being formed by light from the LEDs passing through transparent areas, openings, or cut outs in the optics means, the image being selected from the group consisting of a message, data, logo, time, art, geometric shape(s) and any other image desired to be projected onto the desired surface, the desired surface being a ceiling, a wall, a floor, and any other surface.

One reason that the current invention uses a matrix of LEDs as the light source is because it is difficult to get enough brightness with one LED, whereas a plurality of LEDs will offer the required brightness easily. Also, while one super power LED may have a very high brightness, it also creates very high temperatures. Use of a plurality of LEDs will reduce the heat issues. This is in addition to the advantage, explained above, that the use of a matrix of LEDs having desired specifications, size, brightness, colors, and/or a built-in IC eliminates the need for an inner-medium or display-units as described in the inventor's other application, as well as the need for adjustment or movement means to move the inner-medium or display-units to create a next image. By using a matrix of LEDs in place of the inner-medium or display-units, the image can easily be changed simple by turning selected LEDs in the matrix on and off by circuit means, IC means or any other electric parts and accessories. The different images that can be created by a matrix of LEDS can number in the tens of millions and yet be controlled by a simple market available circuit, all without any moving means, vibration means, or adjustment means.

The construction of the kaleidoscope means not only can be varied as discussed above, but also in other ways. For example, the length needs to be carefully considered. Too short a length will reduce the image number of the display-units. The width of the mirrors of the kaleidoscope means also needs to be arranged properly or the light intensity will be reduce because the distance are too big.

The current invention may also incorporate other optics means, such as convex lens means, concave lens means, magnifying means, laser means, hologram means, focus adjust means, and additional optics means, to cause the image to be more splendid and clearly seen by viewers.

The housing of the LED light is arranged to house all parts and accessories, such as any one or more of the following: optics means, kaleidoscope parts and accessories, tube means, the LED matrix, additional LED light means for other light functions, circuit means, switch means, sensor means, remote means, control means, circuit means, IC means, prong means, power means, batteries, adaptor means, receptacle means, energy storage means, transformers, invertors, a top cover, a bottom base, prong means, interchangeable power means, power saving means, cost saving means, conductive means, conductive wires, angle adjustment means, rotating means, focus adjustable means, motor means, gear set means, or other means to provide a perfect LED light for desk top or plug-in use, both indoors and outdoors.

In addition to being arranged to be plugged into an electric outlet or powered by a direct current power source which may be selected from the group consisting of batteries, rechargeable batteries, an AC adaptor with a jack, transformers, a solar power source, a chemical power source, a generator, and any other direct current power source, the LED light may be powered by an interchangeable power source in which at least one housing member has a uniform compartment arranged to interchangeably receive different power source units, the different power source units including at least one alternating current (AC) powered LED sealed unit that by itself meets all safety standards and requirements for certification by a safety agency, and that fits within the compartment; and at least one direct current (DC) powered LED battery pack that also fits within the compartment, and in which the AC power sealed unit and the DC powered battery pack include at least one LED that serves as a light source for visible light beams; and parts selected from the group consisting of circuit means, trigger means, sensor means, timer means, IC means, prong means, battery rechargeable means, an AC adaptor, DC storage means, battery means, switch means, solar means, generator means, chemical energy means, PCB means, conductive means, attachment means, clip means, twist tight means, screw means, quick connect means, and rechargeable DC storage means. The at least one LED is triggered when an electric signal output by the sealed unit or battery pack is applied to terminals of the at least one LED and thereby causes the at least one LED to emit light and the AC powered LED sealed unit and DC powered LED battery pack are arranged to be interchangeably fit into the uniform compartment of the LED light device to cause the LED device to become a finished product with properties determined by properties of the sealed unit or battery pack, the properties including geometric shape, purpose, function, application, features, and predetermined lighting effects including timing, duration, brightness, or colors.

BRIEF DESCRIPTION OF THE DRAWINGS

FIG. 13 is an exploded perspective view of a preferred embodiment of an LED device having kaleidoscope means but not a miniatures-means, the kaleidoscope image being changeable by manual or automatically control-means, circuit means, IC means or other market-available electric parts and accessories that illuminate different LEDs in an LED matrix by varying on/off time, color, brightness, or flashing frequency to create a variety of functions and effects.

FIG. 14 shows an LED light device with changeable image means which is similar to the LED light device disclosed in the inventor's copending U.S. patent application Ser. No. 13/021,124 and illustrated in FIG. 2A, including projection means, optics means, kaleidoscope means, and, unlike the embodiment of FIG. 13, an inner medium or display unit with miniature means, but which further includes an LED matrix according to the present invention.

FIGS. 1, 2A, 2B show various LED projection light configurations with inner medium or display units as disclosed in the inventor's U.S. patent application Ser. No. 13/021,124, to which the present invention can be applied by utilizing an LED matrix to increase the variety of different geometric images, data, words, moving words (that flash faster than the eye's response time), and color changing light effects that can be provided.

FIGS. 3 to 11 it's the manner in which optics theory is used to create a variety of colorful patterns by using arrangements of 2 mirrors, 3 mirrors, 4 mirrors or any desired number of mirrors at different angles to each other, as described in the inventor's copending U.S. patent application Ser. No. 13/021, 124. FIGS. 12A, 12B, and 12C illustrate the principle of interchangeable power sources for an LED device, as disclosed in earlier patent applications and patents of the invention.

DETAILED DESCRIPTION OF THE PREFERRED EMBODIMENTS

Figure 3:
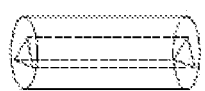

The current invention may utilize features of the projection-type LED devices disclosed in the inventor's U.S. Pat. Nos. 7,832,917; 7,832,918; and 7,871,192, U.S. patent application Ser. Nos. 12/948,953; 12/938,564; 12/886,832; 12/876,507; 12/771,003; 12/624,621; 12/914,584; 12/318, 471; 12/318,470; 12/834,435.

FIG. 13 is an exploded perspective view of an LED device having kaleidoscope means in which a miniatures-means, inner medium, or display unit is replaced by a manually or automatically controlled LED matrix. The control means for the LED matrix may include circuit means, IC means, or any other market-available electric parts and accessories for varying the LEDs' on-off time, color, brightness, flashing frequency, and so forth, to create a variety functions or effects in cooperation with the kaleidoscope means and a preferred optics means. The incorporation of projection means with the optics means, kaleidoscope means, control means, circuit means, LED(s), IC means, and power means enables the kaleidoscope light device to project splendidly colorful and changeable patterns to any desired surface for viewers. The inclusion of a plurality of LEDs with different arrangements and light output can create tens of millions of different geometric image shapes while allowing the consumer to easily change or select images by a simple switch, button, control means, sensor means, and so forth.

FIG. 14 shows an embodiment that is similar to the arrangement disclosed in FIG. 1 of the inventor's copending U.S. patent application Ser. No. 13/021,124 in that it includes projection means, optics means, kaleidoscope means, and miniature means, but the embodiment shown in FIG. 14 further includes an LED matrix similar to the one illustrated in FIG. 13. The images that can be projected by this arrangement include those shown in FIG. 3 to FIG. 11, which are all geometric shapes or patterns. If one needs to project images such as words, movies or video, the miniatures, inner medium, or display units need to be replaced by an LCD or Lcos screen because the LED matrix does not provide a sufficient number of pixels for more detailed images.

FIGS. 1, 2A, and 2B show various LED projection light configurations with inner medium or display units as disclosed in the inventor's U.S. patent application Ser. No. 13/021,124, and to which the LED matrix may be applied to enable use of lower temperature LEDs and enable tens of millions of patterns to be generated simply by controlling turn on and turn off of LEDs in the matrix, the patterns potentially including different geometric images, data, words, or moving words (achieved by turning LEDs off and on at a rate that is faster than the eye's response time), and color changing light effects.

More specifically, FIG. 1 shows an LED device (1) having a changeable projection image (1 g) which has kaleidoscope means (shown in more detail in FIG. 2A) and miniatures means (1d) (1d1) (1d2) (1d3) (1d4) (FIG. 2A, 1-1, 1-6a, 1-6b), the position, location, and relative relationships of which can be changed by manual or automatic control means such as gear-means (1c) to display a variety of different miniatures arranged in different storage compartments or rooms (FIG. 2B, 1-11, 1-11' 1-11") on a gear-assembly wheel (1-c). The gear-assembly wheel (1-c) or other vibration means (FIG. 2A, 1-6C), spin-means (not shown), or motion means (not shown) is connected with inner motor-means (not shown) or a moving device (not shown) or other same-function, equivalent actuating device available in the marketplace. A projection means (FIG. 2A, 1-1, 1-2, 1-3, 1-4, 1-7, 1-8) incorporates optics means (1-5, 1-7, 1-7 a), the kaleidoscope means, the miniatures means (1 d) (1 d 1) (d2) (1 d 3) (1 d 4) (FIG. 2A, 1-6, 1-6 a, 1-6 b), control means (1-c) (FIG. 2A, 1-6c), circuit means, an LED(s), IC means, and power means to project splendidly colorful and changeable patterns to any desired surface using a super bright LED(s).

FIG. 1 shows a plurality of miniatures rooms or compartments with different miniatures being arranged in the different storage rooms or compartments to enable the different miniatures to be changed in order to provide more colorful patterns from one single LED device.

FIG. 1 also shows that the light device may use prongs 1a to connect with an AC power source in the form of a plug-in outlet. However, it is to be appreciated that the light device also can use a DC power source such as batteries, rechargeable batteries, an adaptor with a jacket, a transformer, a generator, solar power, wind power, water power, chemical power, or any other power source. The light of the present invention can similarly use different such power sources, and furthermore may, like the LED light device of FIG. 1, be incorporated with another light source to provide more than one light means and enable the LED device to have more than one light performance, and have different additional functions selected from functions of a consumer electronic device, communication device, optics device, or computer related device.

FIG. 2A shows details of projection means that may be used in the light device of FIG. 1. In particular, FIG. 2A shows projection means (1-1) (1-2) (1-3) (1-4) (1-7 *b*) (1-8), as well as optics means (1-5) (1-7) (1-7 *a*), kaleidoscope means, and interchangeable miniatures means (1-6) (1-6*a*) (1-6*b*). FIG. 2B shows details of the miniatures means (1*d*, 1*d*1, 1*d*2, 1*d*3, 1*d*4), including a plurality of storage rooms or compartments (1-11) (1-11') (1-11") to enable more than one arrangement of miniatures to be included in one device. The traditional kaleidoscope unit only has one of the miniatures for one unit. FIG. 2B also shows gear means which can be manually adjusted to change or rearrange the inner miniatures and provide a variety of colorful, splendid spectra for projection to a desired surface. The gear means (1-10) or bumper means (FIG. 2A, 1-6*c*) also can be incorporated with motor means—such as toy car's motor (not shown), vibration means (not shown), spin means such as a clock movement device (not shown), and/or with a timer, sensor, remote control, motion sensor control, PIR sensor control, music sensor controller, noise controller or any other electric or mechanical controller available from the marketplace to cause the inner miniatures to change their relationship, for example by changing any one or more of a position, location, orientation, height, or attitude.

FIGS. 3 to 11 show detailed constructions of a variety of the kaleidoscope units, each having colorful patterns for presentations in accordance with optics theories. The preferred construction of the kaleidoscope may have 2 mirrors, 3 mirrors, 4 mirrors or any desired number of mirrors at different angles with respect to each other to get the desired color patterns and provide image for projection by the projection assembly, the projection assembly including the projection means, optics means, and LED(s), and related parts and accessories to project splendid, colorful patterns on desired surfaces such as walls, a ceiling, the floor, outdoor surfaces, object surfaces, or any other desired surface.

Figure 4:
Figure 5:
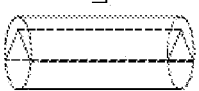

FIGS. 3, 4, and 5 show a 3 mirror arrangement and the colorful, splendid spectrum created thereby.

As shown in FIG. 3, the 3 mirror arrangement has 3 equal sides and each side has a 60 degree angle to form a triangle arrangement inside the kaleidoscope and thereby create the colorful, splendid spectrum shown in the drawing. How the splendid, colorful spectrum is viewed depends on the arrangement of the LED matrix of FIG. 13, and/or the material of the miniatures put into the storage rooms or compartments of the light device, which may selected from colorful pieces of paper, plastic pieces, balls, dried flowers, metal pieces, solid pieces, copper pieces, cotton pieces, liquids, gels or any other objects available on the market.

As shown in FIG. 4,—the 3 mirrors have one 90 degree angle to form a right triangle. The right triangle may be big or small or any size, and is arranged inside a tubular housing. The colorful, splendid patterns will be as illustrated. Again, the appearance of the splendid, colorful spectrum will depend on the LED matrix and/or the material of the miniatures put into the storage rooms or compartments, which may be selected from colorful pieces of paper, plastic pieces, balls, dry flowers, metal pieces, solid pieces, copper pieces, cotton pieces, liquids, gels or any other objects available on the market.

As shown in FIG. 5, the 3 mirrors have two equal sides at a desired angle to one another to form an isosceles triangle. The isosceles triangle may be big or small or any size, and is arranged inside the tubular housing of the light device to form the illustrated colorful, splendid patterns. The appearance of the splendid, colorful spectrum will depend on the LED matrix or the material of the miniatures put into the storage rooms or compartments, which may again be selected from colorful pieces of paper, plastic pieces, balls, dried flowers, metal pieces, solid pieces, copper pieces, cotton pieces, liquids, gels or any other objects available from the market.

Figure 6:
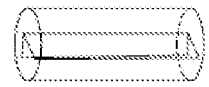
Figure 7:
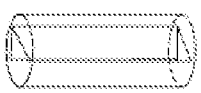
Figure 8:
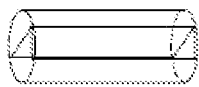

FIGS. 6, 7, and 8 show the 2 mirror arrangements in which a third surface is not a mirror means. FIG. 6 shows 2 mirrors arranged at 22.5 degree angles to form 360/22.5=16 images. FIG. 7 shows 2 mirrors arranged at 30 degree angles to form 360/30=12 images. FIG. 8 shows 2 mirrors arranged at 60 degree angles to form 360/60=6 images of colorful, splendid spectra according to physics theory.

FIG. 9 shows a 4 mirror arrangement that creates a splendid, colorful, and very pretty spectrum.

FIG. 10 shows a cone arrangement of 3 mirrors that can create a pretty, colorful spectrum.

FIG. 11 shows mirrors arranged in a square arrangement to provide a colorful spectrum.

FIGS. 12A, 12B, and 12C show interchangeable power sources that may be used in LED devices having changeable patterns, including those of the preferred embodiments of the present invention, as disclosed in the inventor's U.S. Pat. Publ. No. 2007/0076439, the interchangeable power sources including an AC power source provided in a sealed-unit and a DC battery-pack, each of which can fit into an appropriately shaped recess.

The invention claimed is:

1. An LED device having a kaleidoscope image, comprising:
   an LED device housing;
   a plurality of LEDs arranged in said housing as a light source to supply visible light beams, said plurality of LEDs being arranged in a matrix, the LEDs in the matrix being turned on and off to create different light patterns;
   a plurality of reflective elements for providing multiple reflections of miniatures or display elements, and wherein said reflective elements are arranged in one of the following configurations: (a) a configuration with three mirror elements; (b) a configuration with two mirror elements; (c) a configuration with four mirror elements; (d) a configuration with a tapered mirror element; (e) a configuration with a circular mirror element; and (f) a configuration with a predetermined number of mirrors and mirror-connecting angles selected to create a desired kaleidoscope image;
   at least one projection device for projecting the kaleidoscopic image onto a desired surface, wherein the projection device includes at least one of an optics lens, a convex lens, a concave lens, or a lens assembly, and a tubular element in which said at least one optics lens, convex lens, concave lens, or lens assembly is arranged, wherein said image is formed by light from turned-on LEDs in said matrix being reflected by the reflective elements and passing through the projection device; and
   a power source and circuitry arranged in said housing to cause said LEDs to form said different light patterns.

2. An LED device having a kaleidoscope image as claimed in claim 1, wherein the LED device does not include any miniatures, inner medium, or display units through which light is passed to create the kaleidoscopic image.

3. An LED device having a kaleidoscope image as claimed in claim 1, further including miniatures or display elements including at least one of dichroic glass, prisms, colored glass, glass ball, dried flower pieces, papers, sands, oils with different density, miniature stuff, plastic pieces, colored pieces, transparent pieces, translucent pieces, colorful pieces, and small objects that fit into a space for an inner medium.

4. An LED device having a kaleidoscope image as claimed in claim 1, wherein the power source includes prongs extending directly from said housing of the LED device and arranged to be plugged into an electric outlet.

5. An LED device having a kaleidoscope image as claimed in claim 1, wherein the power source is a DC power source.

6. An LED device having a kaleidoscope image as claimed in claim 1, wherein the LED device housing is arranged to accommodate interchangeable AC and DC power sources.

7. An LED device having a kaleidoscope image as claimed in claim 6, wherein the AC power source is a safety-certified sealed unit that includes said plurality of LEDs.

8. An LED device having a kaleidoscope image as claimed in claim 6, wherein the DC power is a battery pack.

9. An LED device having a kaleidoscope image, comprising:

an LED device housing;

a plurality of LEDs arranged in said housing as a light source to supply visible light beams, said plurality of LEDs being arranged in a matrix, the LEDs in the matrix being turned on and off to create different light patterns;

kaleidoscope means arranged in said housing for forming a kaleidoscopic image, wherein the kaleidoscope means includes a plurality of reflective elements for providing multiple reflections of miniatures or display elements;

at least one projection device for projecting the kaleidoscopic image onto a desired surface, wherein the projection device includes at least one of an optics lens, a convex lens, a concave lens, or a lens assembly, and a tubular element in which said at least one optics lens, convex lens, concave lens, or lens assembly is arranged, wherein said image is formed by light from turned-on LEDs in said matrix being reflected by the reflective elements and passing through the projection device; and a power source and circuitry arranged in said housing to cause said LEDs to form said different light patterns, wherein the LED device does not include any miniatures, inner medium, or display units through which light is passed to create the kaleidoscopic image.

\* \* \* \* \*